(12) United States Patent
Miller (10) Patent No.: US 10,438,594 B2
(45) Date of Patent: Oct. 8, 2019

(54) ADMINISTRATION OF PRIVILEGES BY SPEECH FOR VOICE ASSISTANT SYSTEM

(71) Applicant: Amazon Technologies, Inc., Seattle, WA (US)

(72) Inventor: Gregory Thomas Miller, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 119 days.

(21) Appl. No.: 15/700,008

(22) Filed: Sep. 8, 2017

(65) Prior Publication Data

US 2019/0080698 A1   Mar. 14, 2019

(51) Int. Cl.
| | | |
|---|---|---|
| *G10L 15/06* | (2013.01) | |
| *G10L 17/04* | (2013.01) | |
| *G10L 17/02* | (2013.01) | |
| *G10L 17/06* | (2013.01) | |
| *G10L 17/22* | (2013.01) | |
| *G06F 21/32* | (2013.01) | |

(Continued)

(52) U.S. Cl.
CPC ............. *G10L 17/04* (2013.01); *G06F 21/32* (2013.01); *G10L 15/063* (2013.01); *G10L 17/02* (2013.01); *G10L 17/06* (2013.01); *G10L 17/22* (2013.01); *G06F 2221/2141* (2013.01); *G10L 17/00* (2013.01); *G10L 2015/0638* (2013.01); *G10L 2015/223* (2013.01); *G10L 2015/227* (2013.01)

(58) Field of Classification Search
CPC ....... H04M 3/56; H04W 4/70; G06K 9/00362

USPC ...................... 704/1–10, 230–257, 270–275; 379/202.01
See application file for complete search history.

(56) References Cited

U.S. PATENT DOCUMENTS

| | | | |
|---|---|---|---|
| 2005/0071168 A1* | 3/2005 | Juang ...................... | G10L 17/14 704/273 |
| 2006/0085189 A1* | 4/2006 | Dalrymple .............. | G10L 17/06 704/250 |

(Continued)

FOREIGN PATENT DOCUMENTS

GB        2390191 A      12/2003

OTHER PUBLICATIONS

The PCT Search Report and Written Opinion dated Nov. 7, 2018 for PCT Application No. PCT/US2018/049936, 12 pages.

*Primary Examiner* — Huyen X Vo
(74) *Attorney, Agent, or Firm* — Lee & Hayes, P.C.

(57) ABSTRACT

A voice assistant system may be configured to receive a spoken introduction from a trusted user to introduce a new user and designate access privileges for the new user. The voice assistant system may process the speech using automated speech recognition and may parse the text to determine intent. The voice assistant system may also analyze the speech to determine a profile associated with the speaker that spoke the introduction. The voice assistant system may determine that the trusted user includes administrative privileges. The access privileges, when granted, may allow the new user to interact with the voice assistant system, such as to issue commands, extract information, play media, and/or perform other actions with the voice assistant system, which may be unavailable to people who are not introduced to the voice assistant system by a trusted user and/or do not have the access privileges associated with a user profile.

20 Claims, 7 Drawing Sheets

(51) Int. Cl.
 *G10L 15/22* (2006.01)
 *G10L 17/00* (2013.01)

(56) References Cited

U.S. PATENT DOCUMENTS

| | | | |
|---|---|---|---|
| 2011/0150200 A1* | 6/2011 | Uhler | H04M 3/56 |
| | | | 379/202.01 |
| 2014/0167931 A1 | 6/2014 | Lee et al. | |
| 2015/0170643 A1 | 6/2015 | Nicholson et al. | |
| 2016/0269524 A1 | 9/2016 | Stottlemyer | |
| 2016/0295005 A1* | 10/2016 | Schussmann | H04W 4/70 |
| 2018/0232201 A1* | 8/2018 | Holtmann | G06K 9/00362 |

* cited by examiner

ADMINISTRATION OF PRIVILEGES BY SPEECH FOR VOICE ASSISTANT SYSTEM

BACKGROUND

As computing devices continue to evolve, users expect a more seamless and efficient experience when interacting with their computing devices. Many different techniques and mechanisms have been introduced to allow users to interact with computing devices, such as through use of mechanical devices (e.g., keyboards, mice, etc.), touch screens, motion capture (e.g., gestures), and even using natural language input such as speech. When speech is used as in input, a computing device often sends at least some audio information to a remote computing device for speech processing. As users become accustomed to using voice input to control computing devices, conventional tasks may be reimagined to facilitate completion of the tasks using voice commands.

Some computing tasks require secure processes and/or implementation and enforcement of user privileges to enable users to take certain actions, such as modifying administration settings for a computing device. Traditionally, these types of actions are performed using conventional computing device input devices, such as a keyboard.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

This disclosure is directed to management of user privileges using a voice assistant system where the system enables a user to perform administrator tasks such as to provide access to computing resources by a new user using voice-activated commands with the voice assistant device. The voice assistant device may include any system or device that receives audio commands from a user, processes the audio using automated speech recognition (ASR) and natural language processing (NLP) algorithms to determine text, returns a reply based on the text, converts the reply to an audio output using text-to-speech algorithms, and causes a speaker to output the audio output. In some instances, some voice assistant systems may include a display and may enable users to view text and/or other graphics that may be generated or updated based on speech input received by the systems. A process may include multiple "turns", which define a dialog including multiple related instances of the process. Examples of voice assistant systems include Alexa® provided by Amazon.com® of Seattle, Wash., Siri® provided by Apple Corp.® of Cupertino, Calif., and Cortana® provided by Microsoft Corp.® of Redmond, Wash. The voice assistant system may include a user device that typically includes at least a network interface, a microphone, and a speaker. The user device may be a smart phone, a dedicated device, and/or other devices controlled by users and located proximate to the users. The voice assistant system may include a service engine, which may be stored by the user device, in a remote location (e.g., via remote computing devices such as in a cloud computing configuration, etc.), and/or a combination of both.

In various embodiments, the voice assistant system may be configured to receive an introduction from a trusted user, such as speech that states "This is my friend, John Smith." Here, "John Smith" may be a new user that has not previously interacted with the particular voice assistant system. The voice assistant system may process the speech using ASR and possibly NLU and may parse the text to determine a command or intent. The voice assistant system may also analyze the speech or attributes of the speech to determine the speaker or a profile associated with the speaker that spoke the introduction to the voice assistant system. For example, the tone, volume, pace of words, and/or other speech attributes may be used to determine the speaker or the profile associated with the speaker, such as by determining the speaker is the trusted user. The voice assistant system may determine that the trusted user (e.g., "Sally Jones") includes administrative privileges, possibly via access to a corresponding user profile, and that the text "This is my friend, John Smith" is a command to grant at least some user privileges to John Smith. The user privileges may allow John Smith to interact with the voice assistant system, such as to issue commands, extract information (e.g., ask questions and obtain responses, etc.), play media, and/or perform other actions with the voice assistant system which may be unavailable to people who are not introduced to the voice assistant system by a trusted user and/or do not have privileges associated with a user profile and associated with the particular voice assistant system, but may have privileges associated with a different voice assistant system.

The voice assistant system may receive speech from John Smith, such as "Hi, this is John Smith." The voice assistant system may analyze this speech using ASR and possibly NLU to parse the text to determine another command or intent, which may be associated with the former command or intent to grant privileges to John Smith. The voice assistant system may also analyze the speech to determine attributes of the speech to associate with John Smith. The voice assistant system may create a user profile for John Smith and associate the attributes of the speech with the user profile for John Smith, and may allow subsequent identification of speech as being attributed to John Smith.

The voice assistant system may determine one or more privilege to grant to John Smith, from the trusted user. In some embodiments, the voice assistant system may determine a designation or group of privileges for the new user, John Smith. For example, a group of "friend" may be associated with privileges to grant to John Smith which allow John Smith an ability to receive and/or access certain information and/or content via the voice assistant system using voice commands. Other predefined groups of privileges may be granted to users, which may be grouped and associated with names, such as "guest", "family member", "child" and so forth.

The voice assistant system may enable creation of customized groups and/or customized collections of privileges, possibly by modifying privileges associated with a particular group. In various embodiments, the trusted user may create conditions for privileges. For example, the trusted user may state that privileges expire at a certain time to impose a condition (e.g., "This is my guest, John Smith, until Sunday"). The trusted user may remove a privilege, such as by stating, "remove calendar access for John Smith," which may revoke a privilege of accessing calendar data by John Smith.

In some embodiments, the voice assistant system may initiate at least some voice training with a new user to create and/or refine voice attributes to enable subsequent identification of the new user by way of the new user's voice. The voice assistant system may attempt to locate and access prior voice data associated with the user, which may have been captured during prior user interaction with a different voice assistant system. For example, the new user may interact with his own voice assistant system and may desire to import some information captured by his own voice assistant system for use by another voice assistant system.

The techniques and systems described herein may be implemented in a number of ways. Example implementations are provided below with reference to the following figures.

Figure 1:
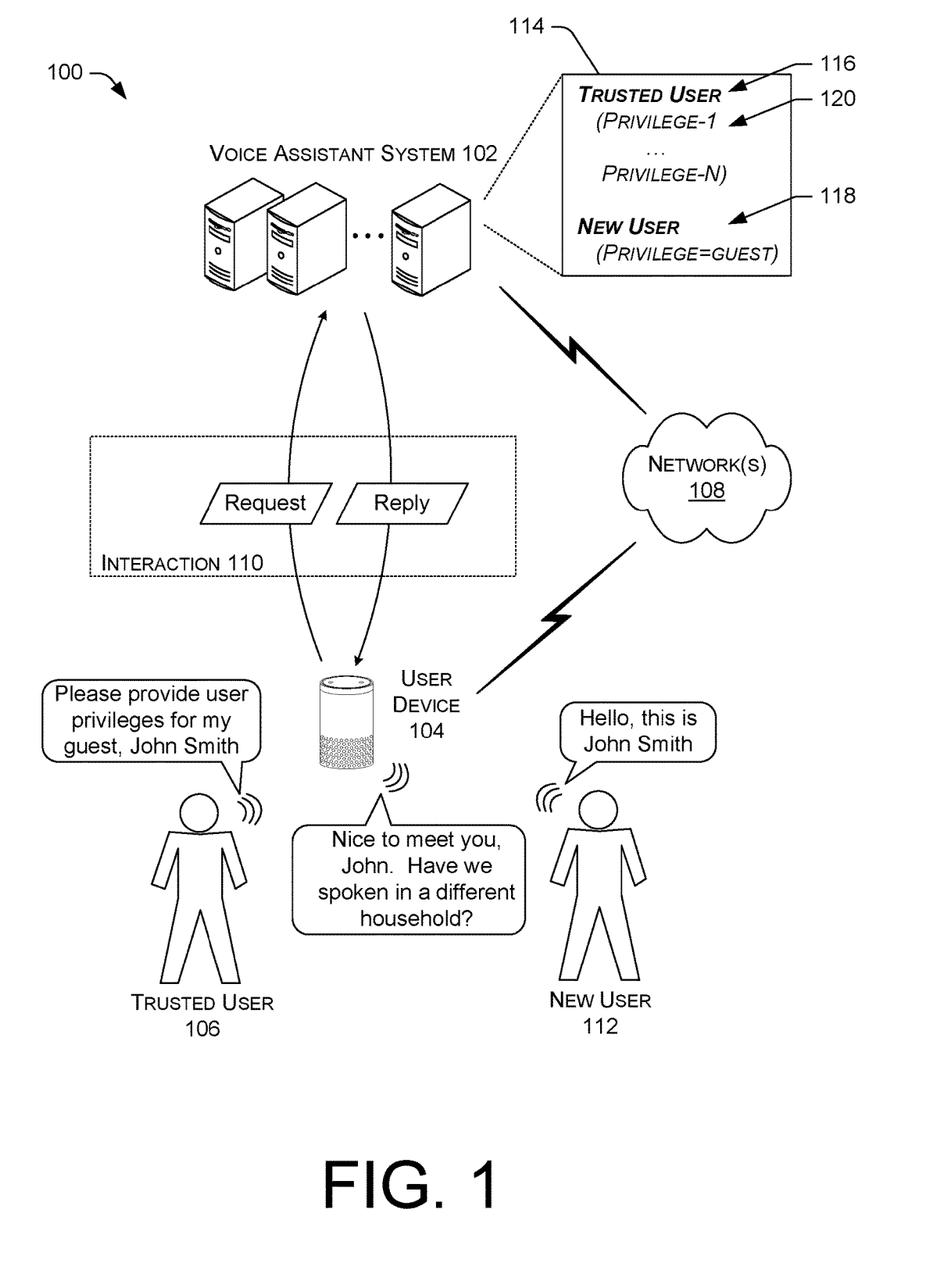
FIG. 1 is a schematic diagram of an illustrative computing environment.

FIG. 1 is a schematic diagram of an illustrative computing environment 100. The environment 100 may include a voice assistant service (VAS) 102 that exchanges data with a user device 104, such as audio data and voice data, to facilitate interaction with a trusted user 106 associated with the user device 104. The user device 104 may be one of any electronic devices that are at least partially controlled using speech commands issued by the trusted user 106. In some embodiments, the user device 104 may be a dedicated speech recognition device that includes few or no other input controls (e.g., few or no buttons, motion devices, imaging devices, etc.). Instead, the user device 104 may receive input from users by receiving spoken commands, which are converted to signals by the user device 104 and/or by a cloud service, and then processed, such as by an exchange of data with the VAS 102. The VAS 102 may be any service that provides data to the user device 104 in response, directly or indirectly, from the user device 104. The VAS 102 need not be configured for speech recognition since at least some speech recognition may be performed prior to sending a request to one of the services in some embodiments. In various embodiments, the VAS 102 may perform at least some ASR and/or NLU on audio captured by the user device 104 and transmitted to the VAS via one or more networks 108. The network(s) may include wired networks, wireless networks, or both.

The VAS 102 may be configured to track specific users associated with the user device 104, and may identify those users by analyzing attributes of voice inputs (speech) and use the identification to associate a user profile with a received voice input. For example, when Sally Jones provides a voice input by speaking to the user device 104, at least part of the voice input may be sent to the VAS 102, which may analyze the voice input to determine that the voice input is associated with Sally Jones. The VAS 102 may associate the voice input with a user profile of Sally Jones. The user profile may include privileges for Sally Jones, which may govern how the VAS 102 responses to Sally Jones, what information the VAS 102 provides to Sally Jones, and so forth.

As discussed herein, in some embodiments, at least some of the operations of the VAS 102 may be performed locally on the user device 104. In various embodiments, the VAS 102 may be wholly implemented with the user device 104 and may reside local to the trusted user 106 (e.g., in the residence of the user, etc.). In at least one embodiment, the user device 104 may be a "dumb" terminal that passes all audio to the VAS 102 for further processing and does not process commands locally.

Users may have or may create special relationships with the VAS 102, such as by way of the user profiles that include information to enable the Vas to positively identify a user and determine privileges for a user (what things tasks, data, operations the VAS can perform or access on behalf of a user). For example, a first user may be associated with a user account via the VAS 102, and may become or be granted privileges of a trusted user. These privileges may include administrative rights which may enable the trusted user to grant privileges to other users. The privileges may define how the VAS 102 and/or the user device 104 interacts with the other users. For example, the VAS 102 may refrain from providing information to a non-registered user with no privileges (and likely no user profile associated with the VAS 102).

The VAS 102 may provide may different types of information, entertainment, or data, such as by proving music, directions, documents, performing tasks (adding things to lists, setting reminders, starting a timer, adding a calendar event, etc.), and so forth. As discussed herein, the VAS may be configured to engage in an interaction 110 with a user. In some embodiments, the interaction may include multiple requests and replies. Each request/reply pair may define a "turn", which is a back and forth exchange of information between a user and the VAS 102 typically byway of the user device 104. For example, when a user asks a question or issues a request, the request may be received by the user device 104 and possibly by the VAS 102. The user device 104 and/or the VAS 102 may, in turn, process the request and generate a system reply, which may be issued back to the user 106. This single back and forth exchange is referred to herein as a single "turn". While some requests may be satisfied in a single turn, other requests may require or include multiple turns before the user achieves an intended result or goal.

To grant privileges to a new user 112, the user device 104 and/or the VAS 102 may process various speech. As an example, the trusted user 106 may speak, "Please provide user privileges for my guest, John Smith". The user device 104 may receive this speech via a microphone, convert the sound to audio signals, and process at least some of those signals and/or send the signals to the VAS 102 for processing. Regardless of the processing protocol, the speech may be analyzed to determine at least (1) that the speaker is the trusted user 106, and (2) that the speech includes a command to grant privileges to "John Smith." As discussed above, the user device 104, the VAS 102, or both may process the speech to determine voice attributes and or text, such as by using ASR and/or NLU algorithms.

The user device 104 may receive additional speech from the new user 112, such as speech that include, "Hello, this is John Smith". The user device 104 may receive this speech via the microphone, convert the sound to audio signals, and process at least some of those signals and/or send the signals to the VAS 102 for processing. Regardless of the processing protocol, the speech may be analyzed associate voice attributes of John Smith with a user profile created for John Smith. The user profile may be created in response to the introduction and request for privileges by the trusted user, discussed above. The user device 104, the VAS 102, or both may process the speech to determine the voice attributes for John Smith and associate those voice attributes with the user profile. The user profile may include the newly created privileges for John Smith.

In some embodiments, the user device 104 may cause a speaker to output sound comprising a message to the new user, such as, "Nice to meet you, John. Have we spoken in a different household?". For example, the user device 104 and/or the VAS may interact with the new user to obtain additional voice attributes through voice training and/or accessing prior voice data associated with the new user 104.

As shown in association with the VAS 102, user profiles 114 may be accessed, created, and/or maintained for different users, such as a first user profile 116 for the trusted user 106 and as second user profile 118 for the new user. Each user profile may include or be associated with different privileges 120, which may determine how or whether the VAS 102 and/or the user device 104 interact with the corresponding user. In some embodiments, the user profiles 114 may be stored locally in association with the user device 104. The user profiles 114 may include voice attributes that may be used to associate speech from a user with a particular user profile as discussed above.

Figure 2:
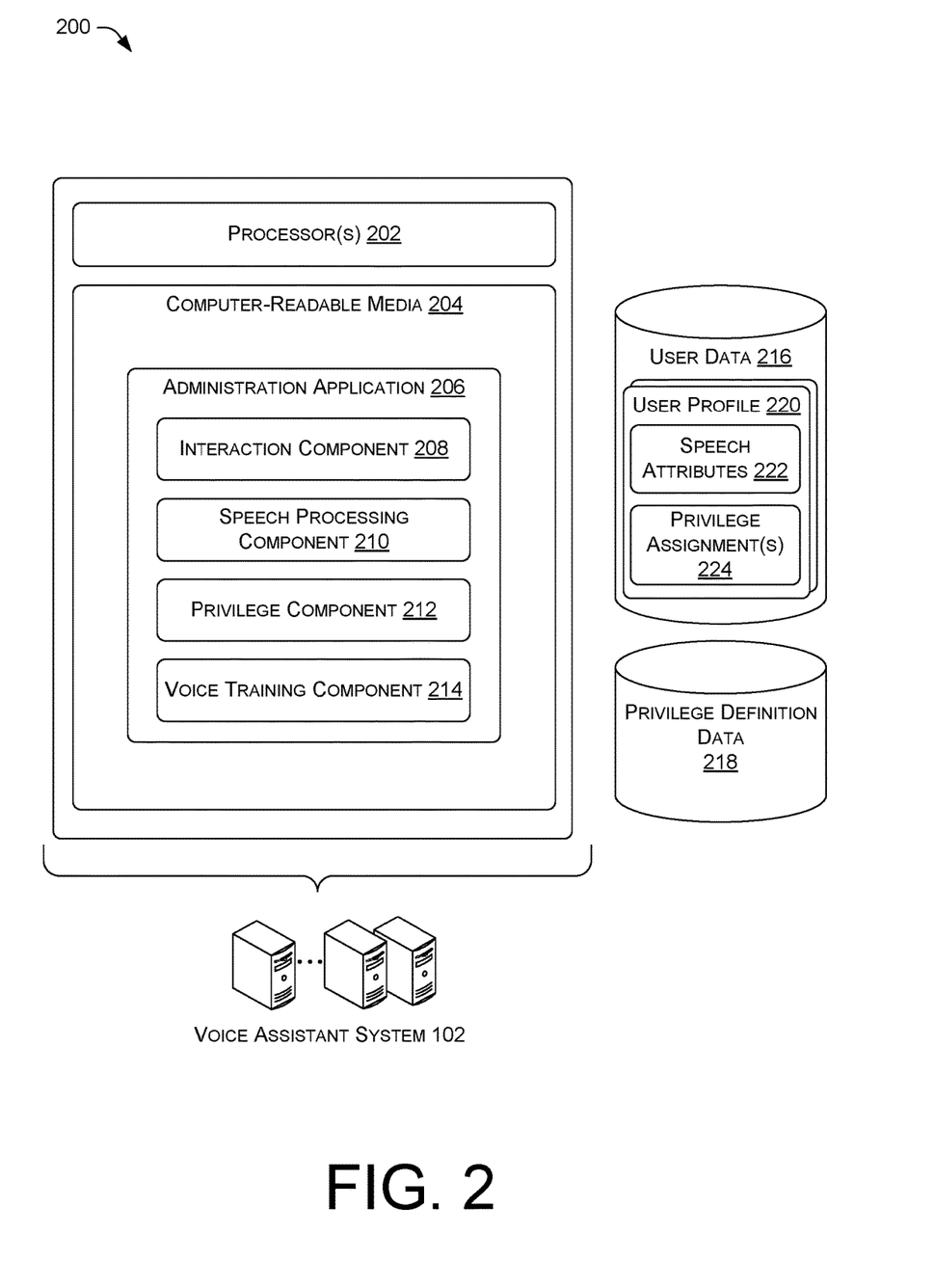
FIG. 2 is a block diagram of an illustrative computing architecture.

FIG. 2 is a block diagram of an illustrative computing architecture 200. The computing architecture 200 may be implemented in a distributed or non-distributed computing environment. The computing architecture 200 may include one or more processors 202 and one or more computer-readable media 204 that stores various modules, applications, programs, or other data. The computer-readable media 204 may include instructions that, when executed by the one or more processors 202, cause the processors to perform the operations described herein.

Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks.

In some embodiments, the computer-readable media 204 may store an administration application 206, which may include an interaction component 208, a speech processing component 210, a privilege component 212, and a voice training component 214. The VAS 102 may store, manage, and/or access user data 216 and/or privilege definition data 218. The various components and/or data stores may be stored together or in a distributed arrangement. The various components are described in turn.

The interaction component 208 may facilitate voice interactions with one or more users. For example, the interaction component 208 may detect and receive a voice input, such as speech from a user, by way of a microphone and/or a user device having the microphone. In some embodiments, the interaction component 208 may be triggered at least in part on receipt of a wake-word or other command that causes a device to begin to "listen" and captures audio signals for further processing. The interaction component 208 may receive speech, such as "This is my friend, John Smith", which may be a command and request to take a specific action, such as to grant "friend" privileges to John Smith, which may enable John Smith to interact with the VAS 102 using voice commands. In various embodiments, the interaction component 208 may analyze received speech to determine a user profile 220 associated with the speech. For example, the interaction component 208 may capture and analyze attributes of received speech, such as tone, volume, pace of words, and/or other speech attributes, compare those attributes to stored speech attributes 222 in the user data 216, and determine from the user data 216 a user profile of a trusted user that is the speaker (user). The interaction component 208 may cause audio output to interact with the speaker. For example, the interaction component 208 may output a response to a speaker that introduced "John Smith" such as by outputting audio that states "I've added John Smith to have privileges of the group friend." Of course, the specific commands and speech received by the interaction component 208 and/or the specific output by the interaction component 208 may be different than the examples provided above while conveying similar types of information. The interaction component 208 may determine an action to perform based on received speech, possibly after processing of the speech by the speech processing component 210. For example, the interaction component 208 may determine that a trusted user desires to grant access privileges to a new user named "John Smith" and the group of privileges is "friend" privileges. In some embodiments, the interaction component 208 may facilitate connecting to a device associated with to a new user using a voice over internet protocol (VoIP). This may enable granting privileges to a second user that is not at a same location as the trusted user. As an example, the new user may be a guest that is going to use a property of the trusted user, but has not yet arrived at the property.

The speech processing component 210 may include speech-to-text algorithm(s) and/or text-to-speech algorithm(s) to enable conversion between audio and text. The speech processing component 210 may employ ASR and/or NLU algorithms to understand commands and information provided by a speaker. The speech processing component 210 may receive request from the interaction component 208, such as audio to convert to text or text to convert to audio, and perform requested tasks for the interaction component 208.

The privilege component 212 may determine privileges and/or manage privileges that may be granted to other users, such as a new user. The privilege component 212 may interact with the privilege definition data 218 to determine privileges and/or modify privileges based on interaction with one or more users, such as the trusted user. For example, the trusted user may request that certain privilege assignments 224 be granted to a new user, which may be associated with the user profile 220 of the new user. The privilege component 212 may determine a group of privileges as the privilege assignment(s) 224, possibly referred to by a label such as "friend", "guest", "family member", "child", or other label, which is associated in the privilege definition data 218 with corresponding specific privileges. For example, privileges may enable a user to issue commands, extract information (e.g., ask questions and obtain responses, etc.), play media, purchase items, control other devices such as home lights and/or thermostats, and/or perform other actions with the voice assistant system which may be unavailable to people who do not have privileges associated with a user profile and associated with the particular voice assistant system, but may have privileges associated with a different voice assistant system.

The privilege component 212, possibly in conjunction with one or more other component, may enable the trusted user to create a new group or define a group that includes a name of the group and privileges for the group. The privilege component 212 may implement a schema that enables the trusted user to enter, via speech or other inputs, selections and/or parameters to define a group of privileges. For example, the trusted user may desire to create a new group called "best friend" that includes privileges similar to the group "friend", but also include some additional privileges and/or other differences. As discussed above, some groups may be predefined by the administration application 206. The privilege component 212 may enable creation of a new group by copying then editing an exist group, among other techniques to leverage existing information from groups.

In some embodiments, the privilege component 212 may enable customization to privileges, such as by granting additional privileges to a user beyond default privileges associated with a group, removing or removing some privileges, and/or creating conditions for use or duration of privileges (e.g., create expiration of privileges, time periods for use of privileges, spending limits, purchase categories, consumption limits, and so forth). As an example, a privilege may be granted that enables the new user to order items from a service by speech input with the VAS 102. The privilege may include conditions that include a spending limit (e.g., $100 a week, etc.) and whitelisted and/or blacklisted categories of items eligible for order (e.g., only cleaning items, no video games, etc.). As another example, a condition may be imposed of a consumption time for media, such as "John may listen to up to two hours of music a day" or "John may not listen to music containing explicit lyrics". Many other types of conditions may be associated with privileges. The conditions may be customized for each user and, in some instances, may be customized for a particular group.

The voice training component 214 may determine attributes of a new user's voice to enable the interaction component 208 to associate the user profile 220 with the new user in response to receiving speech from the new user during a subsequent session with the voice assistant system 102. The voice training component 214 may analyze speech from the new user and create and/or refine the speech attributes 222 of the speech that enables associating subsequent speech with the user profile 220 of the new user. In some embodiments, the voice training component 214 may cause the interaction component 208 to initiate dialog with the new user to extract additional speech from the new user for analysis by the voice training component 214 to further create and/or refine the attributes of the speech. The voice training component 214 may maintain or generate an attribute confidence score based on the attributes, which may be compared to a threshold score or range of scores. The comparison may inform whether to request additional speech from the new user to extract or further refine the attributes, possibly using a loop process, such as the process described with reference to FIG. 4 below.

In various embodiments, the voice training component 214 may attempt to associate the new user with prior obtained speech attributes, which may be associated with a different voice assistance system or different instance of the VAS 102. For example, the voice training component 214 may cause the interaction component 208 to determine whether the new user interacted with a voice assistant system in a different household, and then collect details of past interactions, if present and available, for associating with the current instance of the VAS 102 that is interacting with the new user. By associating prior voice interaction data, the speech attributes 222 of the new user's voice may be obtained with minimal or no additional training as described above, and may then be stored or associated with the user profile 220. As an example, the voice training component 214 may implement a process similar to that described with reference to FIG. 5 below.

Of course, the administration application 206 may include more or fewer components. In some embodiments, the interaction component 208 may operate at least partly as an operating system or high level function that calls lower level functions, such as the speech processing component 210, the privilege component 212, and/or the voice training component 214 to perform specific tasks to enable a trusted user to provide permissions to a new user by way of a speech introduction as described herein.

FIGS. 3-7 are flow diagrams of illustrative processes illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 3:
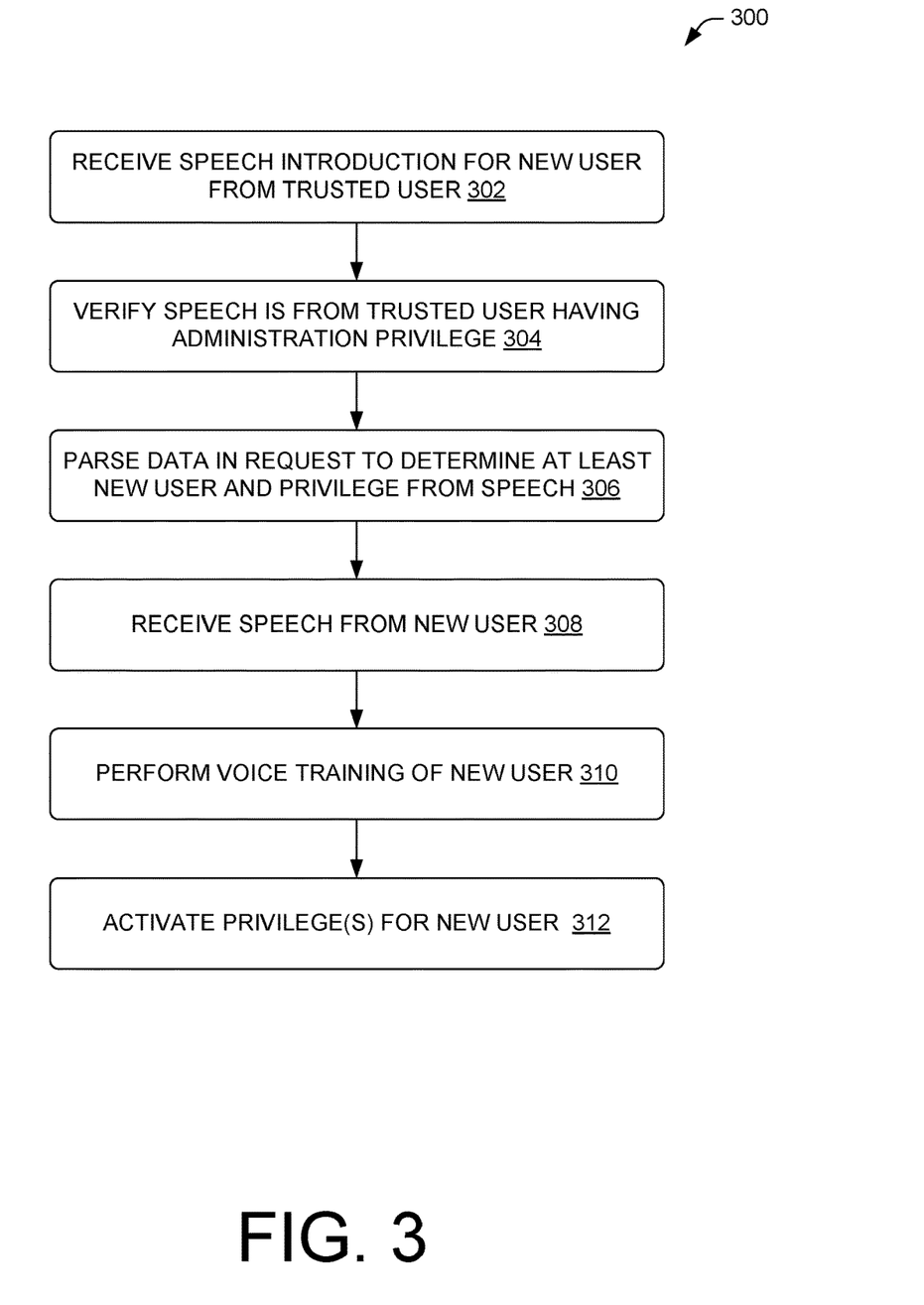
FIG. 3 is a flow diagram of an illustrative process to analyze speech from a trusted user and speech from new user to administer a new privilege to the new user.

FIG. 3 is a flow diagram of an illustrative process 300 to analyze speech from a trusted user and speech from new user to administer a new privilege to the new user. The process 300 is described with reference to the environment 100 and the computing architecture 200, but may be implemented in different environments and/or with different computing architecture.

At 302, the interaction component 208 may receive audio of a speech introduction from a trusted user that introduces a new user. For example, the voice assistant system 102 may be configured to receive an introduction from a trusted user, such as speech that states "This is my friend, John Smith." Here, "John Smith" may be a new user that has not previously interacted with the particular voice assistant system 102.

At 304, the interaction component 208 may determine whether the speech is from a trusted user that has administrative privileges to grant privileges to other users. In some embodiments, the interaction component 208 may analyze received speech from the operation 302 to determine a user profile associated with the speech. For example, the interaction component 208 may capture and analyze attributes of received speech, such as tone, volume, pace of words, and/or other speech attributes, compare those attributes to stored attributes in the user data 216, and determine from the user data 216 a user profile of a trusted user that is the speaker (user). The voice assistant system 102 may determine that the trusted user (e.g., "Sally Jones") includes administrative privileges, possibly via access to a corresponding user profile, and that the text "This is my friend, John Smith" is a command to grant at least some user privileges to the new user.

At 306, the speech processing component 210 and/or the interaction component 208 may parse data in a request to determine the request, a new user, and a privilege or privilege group from the received speech at the operation 302. For example, the speech processing component 210 may use ASR and possibly NLU to convert audio to text. The text may be parsed to determine various information, such as the user name and privilege information. The interaction component 208 may create a new user profile for the new user, John Smith if a user profile does not exist in the user data 216. The user profile may store voice attributers, privileges, command history data, and/or other information. In some embodiments, the privilege component 212 may associate a label of the privilege with privileges defined in the privilege definition data 218. The voice assistant system 102 may determine one or more privileges to grant to the new user by the trusted user. In some embodiments, the voice assistant system 102 may determine a designation or group of privileges for the new user, John Smith. For example, a group of "friend" may be associated with privileges to grant to John Smith which allow John Smith an ability to receive and/or access certain information and/or content via the voice assistant system using voice commands. Other predefined groups of privileges may be granted to users, which may be grouped and associated with names, such as "guest", "family member", and so forth.

At 308, the interaction component 208 may receive speech from the new user, such as "Hi, this is John Smith." In some embodiments, the interaction component 208 may prompt the new user to provide speech, such as by emitting audio such as "Nice to meet you, can you introduce yourself?" The voice assistant system may analyze this speech using ASR and possibly NLU to parse the text to determine another command or intent, which may be associated with the former command or intent to grant privileges to John Smith. In some embodiments, the speech from the new user may be associated with a time stamp, which may be compared to a time stamp associated with speech from the trusted user. The comparison may be used to enforce a timeout or other temporal condition that may be enforced by the administration application 206. For example, the granting of privileges may require a reply by the new user (e.g., via the operation 308) within a threshold amount of time after an introduction from the trusted user (e.g., via the operation 302).

At 310, the voice training component 214 may analyze the speech to determine attributes of the speech to associate with a user profile for John Smith. The voice training component 214 may add and/or refine attributes in association with a user profile for the new user, which may allow subsequent identification of speech as being attributed to the new user. In some embodiments, the voice assistant system may initiate at least some voice training with a new user to create and/or refine voice attributes to enable subsequent identification of the new user by way of the new user's voice.

At 312, the privilege component 212 may activate or one or more privilege granted to the new user to enable the new user to interact with the voice assistant system 102. The user privileges may allow the new user to interact with the voice assistant system, such as to issue commands, extract information (e.g., ask questions and obtain responses, etc.), play media, and/or perform other actions with the voice assistant system which may be unavailable to people who are not introduced to the voice assistant system by a trusted user and/or do not have privileges associated with a user profile and associated with the particular voice assistant system, but may have privileges associated with a different voice assistant system.

Once the new privileges are active for the new user, the new user may speak a command to the user device 104, which may be received by the VAS 102 (shown in FIG. 1). The new user's voice may be analyzed to determine attributes, which may be compared to stored attributes to determine an identity of the user as the new user. The speech may be converted to text and analyzed to determine a request, such as "play some new music". The VAS 102 may return text and/or context to the user device 104 to implement the requested action upon verification that the speaker (i.e., the new user) has a valid and current privilege to receive the action requested (e.g., playing music).

Figure 4:
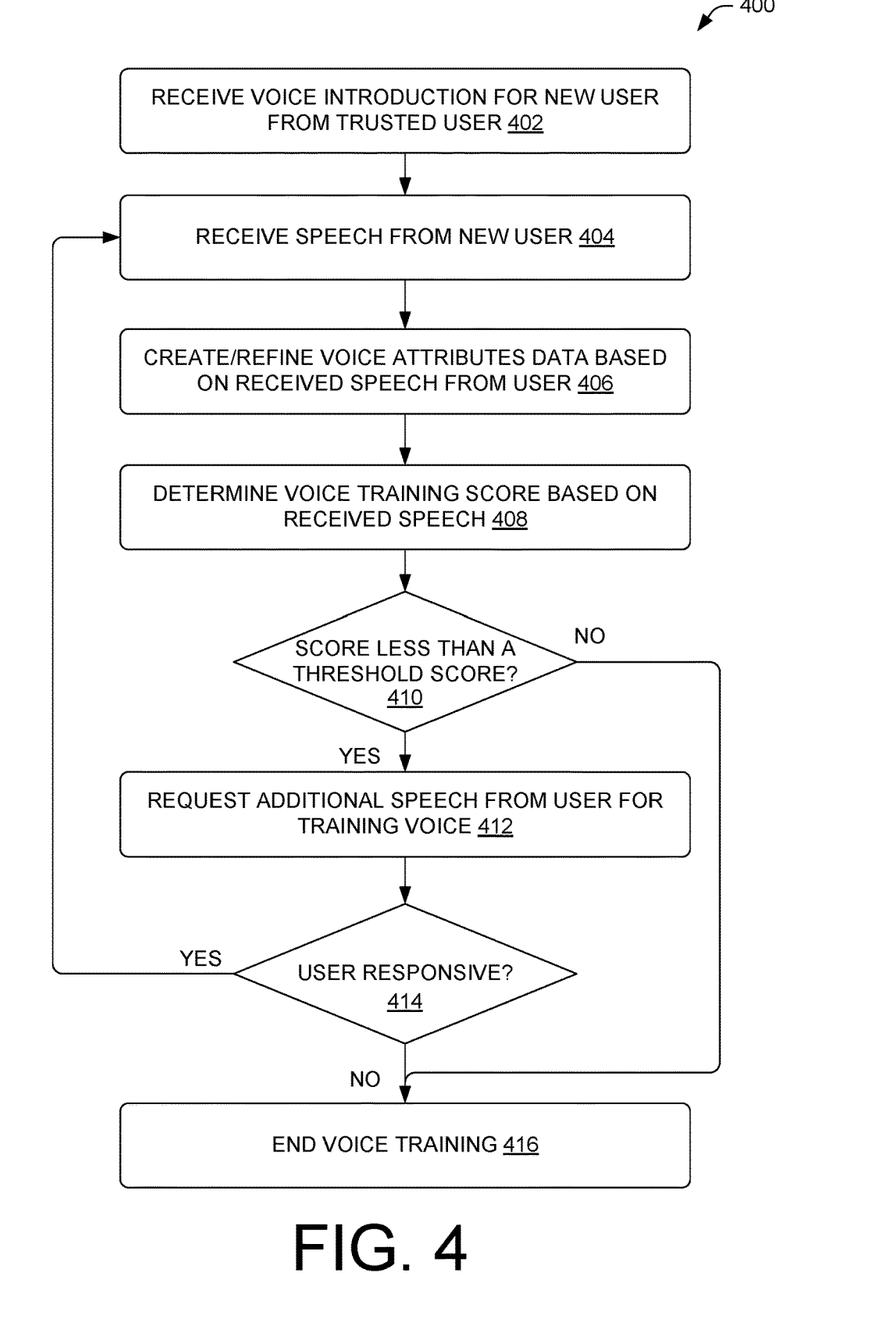
FIG. 4 is a flow diagram of an illustrative process to create and/or refine voice attributes of the new user through voice training.

FIG. 4 is a flow diagram of an illustrative process 400 to create and/or refine voice attributes of the new user through voice training. The process 400 is described with reference to the environment 100 and the computing architecture 200, but may be implemented in different environments and/or with different computing architecture.

At 402, the interaction component 208 may receive audio of a speech introduction from a trusted user that introduces a new user. For example, the voice assistant system 102 may be configured to receive an introduction from a trusted user, such as speech that states "This is my friend, John Smith." The interaction component 208, in conjunction with the speech processing component 210, may determine text for the speech and parse the speech to determine a command, a new user, and a request for certain privileges as discussed above with reference to the process 300.

At 404, the interaction component 208 may receive speech from the new user, such as "Hi, this is John Smith" or possibly other speech from the new user. The voice assistant system 102 may analyze this speech using ASR and possibly NLU to parse the text to determine another command or intent, which may be associated with the former command or intent to grant privileges to the new user.

At 406, the voice training component 214 may analyze the speech received at the operation 404 to determine attributes of the speech to associate with a user profile for the new user. The voice training component 214 may add and/or refine attributes in association with a user profile for the new user, which may allow subsequent identification of speech as being attributed to the new user.

At 408, the voice training component 214 may determine a voice attribute score for the new user. The voice attribute score may represent a confidence level of the attributes to accurately identify the new user's voice from among other audio received by the interaction component 208.

At 410, the voice attribute score may be compared to a threshold score to determine whether or not to continue with voice training of the attributes. When the voice attribute score is less than the threshold score (following the "yes" route from the decision operation 410), then the process 400 may advance to an operation 412.

At 412, the voice training component 214, possibly in conjunction with the interaction component 208, may request additional speech from the new user for voice training purposes. For example, the voice training component 214 may cause output of an audio question that may invoke a spoken response from the new user where the spoken response may be analyzed to determine or refine attributes used to positively identify speech associated with the new user. In some embodiments, the voice training component 214 may cause output of different questions and/or other request in order to invoke speech by the new user, where the speech may be in response to questions, a repeated speech of information provided to the new user (e.g., "repeat after me . . . "), and/or other requests for speech from the user.

In some embodiments, the administration application 206 may request speech from the new user to determine unique identifying information, which may be added to the user profile 220 that is associated with the new user. The unique identifying information may be used to create a unique identifier for the user. As an example, unique identifying information may include a telephone number of the new user, a physical address of the new user, an electronic mail address of the new user, and/or other unique information that is associated with the new user and can be used to identify the new user from other users. The unique identifying information may be keep private and may not be shared with other users to the extent possible when interacting with the voice assistant system 102.

At 414, the voice training component 214 may determine whether additional speech was received from the new user. When additional speech is received from the new user (following the "yes" route from the decision operation 414), then the process 400 may advance to the operation 404 and continue processing as described above and herein. However, in some instances, the new user may not respond, such as when the new user has left a location of a microphone or for other reasons. When additional speech is not received from the new user (following the "no" route from the decision operation 414) or when the voice attribute score reaches or exceeds the threshold score (following the "no" route from the decision operation 410), then the process 400 may advance to an operation 416.

At 416, the voice training component 214 may terminate voice training, at least temporarily, for the new user. For example, additional voice training may be performed or resumed at a later interaction with the new user.

In some embodiments, the process 400 may verify that the trusted user and the new user are collocated in a same location. For example, the administration application 206 may request the users take certain actions and/or provide certain speech that provides evidence of collocation. However, in some embodiments, collocation may not be imposed as a condition to create or grant privileges to the new user. For example, the new user may be a future visitor and guest of the trusted user and may be in communication with the VAS 102 via a voice of internet connection or other connection, for example.

Figure 5:
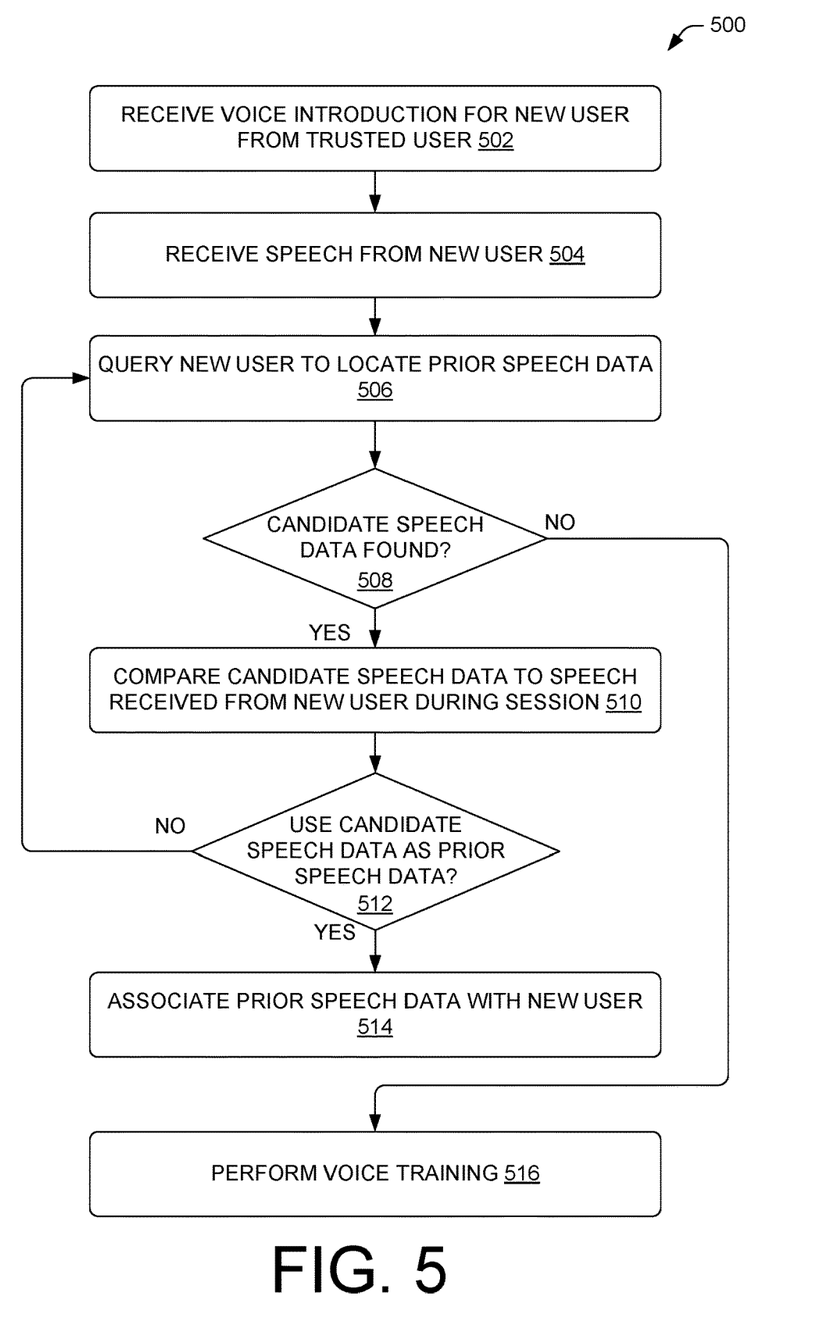
FIG. 5 is a flow diagram of an illustrative process to associate prior speech data with the new user based on prior speech interactions.

FIG. 5 is a flow diagram of an illustrative process 500 to associate prior speech data with the new user based on prior speech interactions. The process 500 is described with reference to the environment 100 and the computing architecture 200, but may be implemented in different environments and/or with different computing architecture.

At 502, the interaction component 208 may receive audio of a speech introduction from a trusted user that introduces a new user. For example, the voice assistant system 102 may be configured to receive an introduction from a trusted user, such as speech that states "This is my guest, John Smith." The interaction component 208, in conjunction with the speech processing component 210, may determine text for the speech and parse the speech to determine a command, a new user, and a request for certain privileges as discussed above with reference to the process 300.

At 504, the interaction component 208 may receive speech from the new user, such as "Hi, this is John Smith" or possibly other speech from the new user. The voice assistant system 102 may analyze this speech using ASR and possibly NLU to parse the text to determine another command or intent, which may be associated with the former command or intent to grant privileges to the new user.

At 506, the voice training component 214 may query the new user to locate prior speech data. For example, the voice training component 214 may cause the interaction component 208 to output an audible question, "Hi John Smith, have we spoken before at a different household or location?". The voice training component 214 may perform this inquiry, similar inquiries, and/or additional inquiries to determine information to enable the voice training component 214 to locate prior speech data associated with John Smith, if any such speech data exists. If the new user indicates that he/she has not spoken with the system before, then the inquiry may terminate. The operation 506 may receive speech from the new user, process the speech to determine text, and process the text to determine whether prior speech data is available, and if so, where it may be located. For example, the new user may indicate an address of a home where he/she has previously used a voice assistant system. Other associations may be made by referencing a user profile and/or some personal identification information, such as a user profile name.

At 508, the voice training component 214 may determine whether candidate speech data can be located based on a spoken response received from the user and a search performed by the voice training component 214. The search may include a search of information accessible to the voice assistant system. In some embodiments, the new user may provide certain permissions to enable the voice assistance system to access prior speech data. For example, authorizations may be performed secondary device, such as using text messaging via a mobile telephone or other simple two step authentication processes. Here, the speech data is called "candidate" because it has not been confirmed as belonging to the new user until further processing described below. When candidate speech data is found (following the "yes" route from the decision block 508), then the process 500 may advance to an operation 510.

At 510, the voice training component 214 ma compare the candidate speech data found to speech data received from the new user during the session (e.g., in response to the new user saying something like "Hi, this is John Smith."). For example, the voice training component 214 may compare attributes of the current speech data with attributes of the candidate speech data to determine if variances in attributes are less than corresponding thresholds. For example, attributes such as tone, speed, volume, and/or other voice attributes may be compared to determine if the candidate speech data likely belongs to the new user and is not actually speech data from a different user.

At 512, the voice training component 214 may determine whether to use the candidate speech data as speech data for the new user based at least in part on the comparison performed at the operation 510. When the voice training component 214 determines not to use the candidate speech data as speech data for the new user (following the "no" route from the decision operation 512), then the process 500 may advance to the operation 506 for further processing, such as to again attempt to find prior speech data for the new user. However, in some embodiments, the process 500 may end here. When the voice training component 214 determines to use the candidate speech data as speech data for the new user (following the "yes" route from the decision operation 512), then the process 500 may advance to an operation 514 for further processing.

At 514, the voice training component 214 may associate the prior speech data with the new user. For example, the voice training component 214 may use the prior speech data to create and/or refine some or all of the voice attributes for the new user to enable the interaction component to accurately identify the new user by his/her speech received during a subsequent interaction with the voice assistant system 102. In some embodiments, the process 500 may omit or skip the operation 510 and 512 and proceed directly from the decision operation 508 to the operation 514 such as when the candidate speech has a high confidence as being from the new user. The candidate speech may have a high confidence when the candidate speech is associated with a household that only has a single user, is associated with a specific user identifier, and so forth.

When candidate speech data is not found (following the "no" route from the decision block 508), then the process 500 may advance to the operation 516. For example, the "no" route may be triggered from a response that no prior speech data exists (e.g., the new user is a first time user) or the information provided by the new user did not enable the voice training component 214 to located any candidate speech data. At 516, the voice training component 214 may perform voice training, such as by performing at least some of the operations of the process 400 described above. In some embodiments, the operation 514 may be followed by at least some additional voice training when a voice score for the new user is less than a threshold voice score as discussed above with reference to the process 400.

Figure 6:
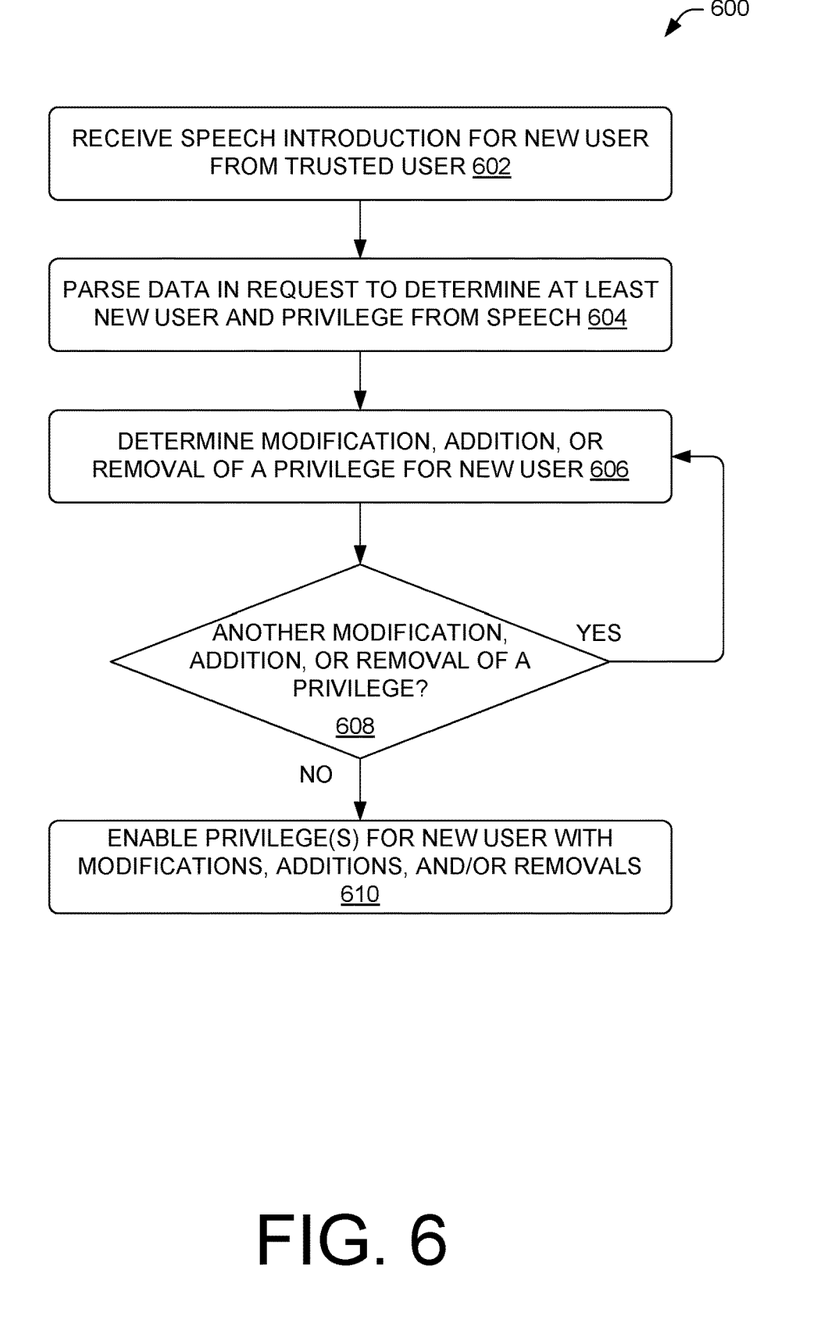
FIG. 6 is a flow diagram of an illustrative process to customize privileges for the new user or another user.

FIG. 6 is a flow diagram of an illustrative process 600 to customize privileges for the new user or another user. The process 600 is described with reference to the environment 100 and the computing architecture 200, but may be implemented in different environments and/or with different computing architecture. The process 600 may be performed by receipt of speech from the trusted user and without presence or voice input by the new user.

At 602, the interaction component 208 may receive audio of a speech introduction from a trusted user that introduces a new user. For example, the voice assistant system 102 may be configured to receive an introduction from a trusted user, such as speech that states "This is my guest, John Smith, who can also access my smart home controls." Here, "John Smith" may be a new user that has not previously interacted with the particular voice assistant system 102. The interaction component 208 may determine whether the speech is from a trusted user that has administrative privileges to grant privileges to other users.

At 604, the speech processing component 210 and/or the interaction component 208 may parse data in a request to determine the request, a new user, and a privilege or privilege group from the received speech at the operation 602. For example, the speech processing component 210 may use ASR and possibly NLU to convert audio to text. The text may be parsed to determine various information, such as the user name and privilege information as discussed above with reference to operation 306 in the process 300. The voice assistant system 102 may determine one or more privileges to grant to the new user by the trusted user. In some embodiments, the voice assistant system 102 may determine a designation or group of privileges for the new user, John Smith. For example, a group of "guest" may be associated with privileges to grant to John Smith which allow John Smith an ability to receive and/or access certain information and/or content via the voice assistant system using voice commands. Other predefined groups of privileges may be granted to users, which may be grouped and associated with names, such as "guest", "family member", and so forth.

At 606, the privilege component 212 may determine a modification, addition, or removal of a privilege for the new user. For example, in the introduction of the new user, the example speech included an additional privilege of "access my smart home controls." This privilege may not be included in a "guest" set of privileges, in this example, buy may be added on to privileges granted to the new user, John Smith. Note that the additional privilege may not impact other users with guest privileges, but may only provide the new user, John Smith, with this additional privilege.

At 608, the privilege component 212 may determine, possibly via the interaction component 208, whether additional modifications, additions, and/or removals of privileges are to be performed for the new user. For example, at least some of the modifications, additions, and/or removals of privileges may be received by speech from the trusted user after an introduction of the new user, possibly during a different session, such as during a different day. Removal of privileges may include removal of individual privileges and/or revocation of all the new user's privileges. Modification of a privilege may include modifying a condition, as described below with reference to FIG. 7, for example. When another modification, addition, or removal of a privilege is to be performed (following the "yes" route from the decision operation 608), then the process 600 may advance to the operation 606 to process additional information as described above. When another modification, addition, or removal of a privilege is not to be performed (following the "no" route from the decision operation 608), then the process 600 may advance to an operation 610.

At 610, the privilege component 212 may activate or one or more privilege granted to the new user and/or modifications, additions, and/or removals of privileges to enable the new user to interact with the voice assistant system 102 in accordance with currently granted privileges. The user privileges may allow the new user to interact with the voice assistant system, such as to issue commands, extract information (e.g., ask questions and obtain responses, etc.), play media, and/or perform other actions with the voice assistant system which may be unavailable to people who are not introduced to the voice assistant system by a trusted user and/or do not have privileges associated with a user profile and associated with the particular voice assistant system, but may have privileges associated with a different voice assistant system.

Figure 7:
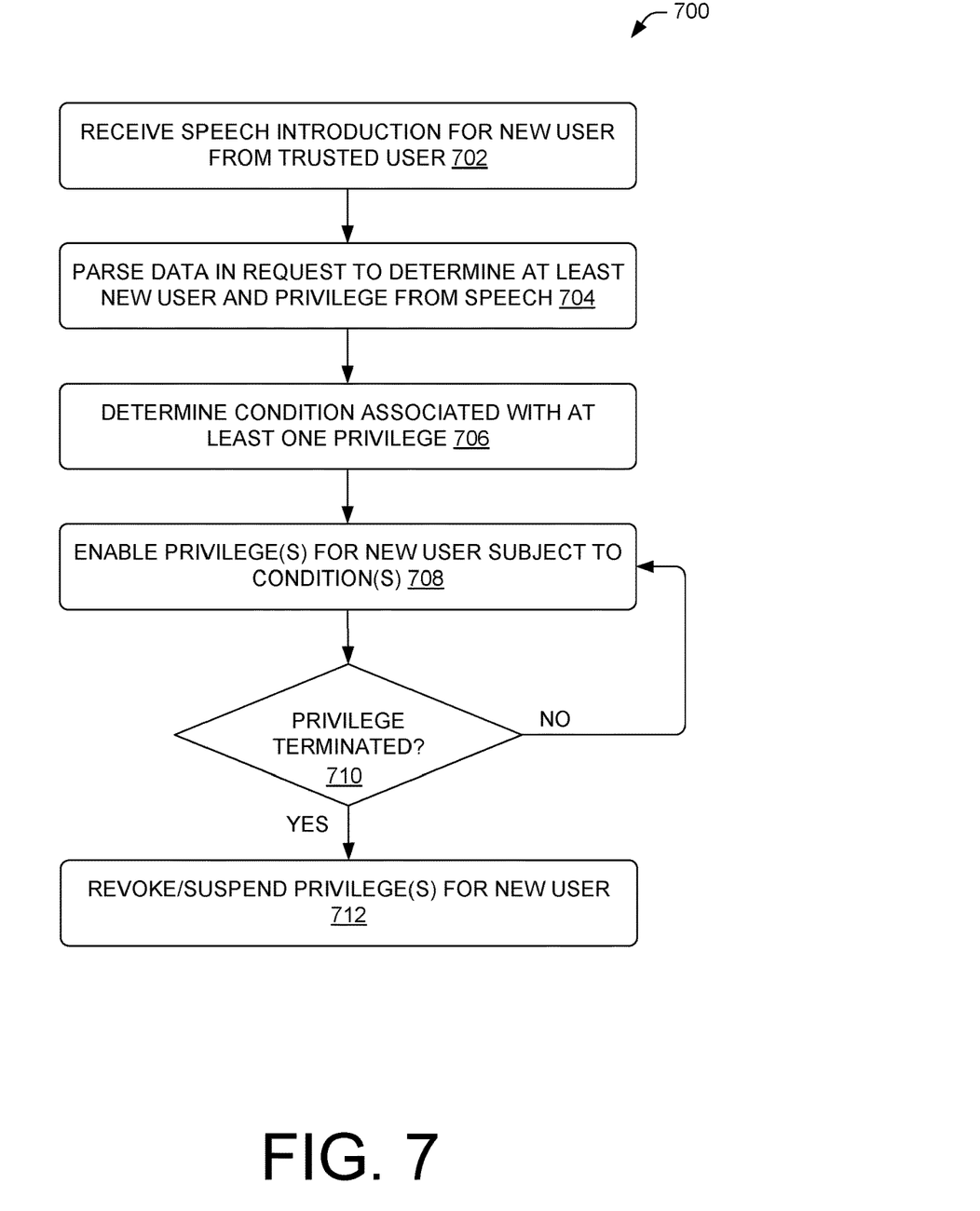
FIG. 7 is a flow diagram of an illustrative process to create and enforce conditions associated with granted privileges.

FIG. 7 is a flow diagram of an illustrative process 700 to create and enforce conditions associated with granted privileges. The process 700 is described with reference to the environment 100 and the computing architecture 200, but may be implemented in different environments and/or with different computing architecture.

At 702, the interaction component 208 may receive audio of a speech introduction from a trusted user that introduces a new user. For example, the voice assistant system 102 may be configured to receive an introduction from a trusted user, such as speech that states "This is my guest for the day, John Smith." Here, "John Smith" may be a new user that has not previously interacted with the particular voice assistant system 102. The interaction component 208 may determine whether the speech is from a trusted user that has administrative privileges to grant privileges to other users.

At 704, the speech processing component 210 and/or the interaction component 208 may parse data in a request to determine the request, a new user, and a privilege or privilege group from the received speech at the operation 702. For example, the speech processing component 210 may use ASR and possibly NLU to convert audio to text. The text may be parsed to determine various information, such as the user name and privilege information as discussed above with reference to operation 306 in the process 300. The voice assistant system 102 may determine one or more privileges to grant to the new user by the trusted user. In some embodiments, the voice assistant system 102 may determine a designation or group of privileges for the new user, John Smith. For example, a group of "guest" may be associated with privileges to grant to John Smith which allow John Smith an ability to receive and/or access certain information and/or content via the voice assistant system using voice commands. Other predefined groups of privileges may be granted to users, which may be grouped and associated with names, such as "guest", "family member", and so forth.

At 706, the privilege component 212 may determine a condition of one or more privileges for the new user. For example, in the introduction of the new user, the example speech included a condition of "day." The condition may be a temporal condition, such as an expiration or a time range when privileges are in effect. Other conditions may also be imposed, such as which content the new user has access to (e.g., no music with explicit lyrics, etc.). Conditions may be provided in separate speech from the trusted user, and do not necessarily have to be included in the introduction or initial granting of the privileges to the new user, John Smith.

At 708, the privilege component 212 may activate or one or more privilege granted to the new user to enable the new user to interact with the voice assistant system 102. The user privileges may allow the new user to interact with the voice assistant system, such as to issue commands, extract information (e.g., ask questions and obtain responses, etc.), play media, and/or perform other actions with the voice assistant system which may be unavailable to people who are not introduced to the voice assistant system by a trusted user and/or do not have privileges associated with a user profile and associated with the particular voice assistant system, but may have privileges associated with a different voice assistant system.

At 710, the privilege component 212 may determine whether a condition has taken effect, such as whether the privilege has expired or are not currently available. When a privilege is not subject to a condition or terminated (following the "no" route from the decision operation 710), then the process 700 may advance to the operation 708 and continue to enable the new user to use privileges granted by the trusted user. When a privilege is subject to a condition and terminated (following the "yes" route from the decision operation 710), then the process 700 may advance to an operation 712.

At 712, the privilege component 212 may revoke one or more privilege that is subject to a condition and has expired, at least temporarily. For example, if the privilege is subject to a condition of time of day controls (e.g., privileges only active from 8 am to 10 pm, etc.), then the privileges may be activated again at a later time.

In some embodiments, a condition may be applied to multiple users. For example, a trusted user may be hosting a party and may state "let everyone control the music tonight." The privilege component 212 may create a permission for all to access music control commands, such as to play music, select music, and/or perform other music control commands by speaking to the voice assistant system 102. The privilege component 212 may create a condition with an expiration of the day (due to the time frame "tonight"). The privilege component 212 may revoke the privilege for all to control music at the end of the time duration (e.g., end of the day, or some other time).

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A computer-implemented method implemented by a voice-controlled assistant, the computer-implemented method comprising:

receiving first audio data representing first speech from a first user;

analyzing first attributes of the first audio data to determine that the first speech is associated with a first user profile having an administration privilege;

determining a second user and a group of privileges based at least in part on processing of the first speech;

creating a second user profile associated with the second user;

providing a first prompt to request speech from the second user;

receiving second audio data representing second speech from the second user;

training a voice training algorithm to create voice attributes associated with the second user using a first voice training data that includes the second audio data;

providing a second prompt including a question that requests the second user to provide additional speech to be received as training data, wherein the question is selected from a plurality of predetermined questions used by the voice training algorithm to refine the voice attributes based at least in part on the first voice training data;

receiving third audio data representing third speech from the second user;

training the voice training algorithm to refine the voice attributes associated with the second user using a second voice training data that includes the third audio data;

determining, by using the voice training algorithm, second attributes derived from the third speech, the second attributes to enable identification of subsequent speech associated with the second user; and associating the second attributes and the group of privileges with the second user profile.

2. The computer-implemented method as recited in claim 1, further comprising:

associating the second user profile with prior speech data based at least in part on additional speech provided by the second user; and creating the second attributes based at least in part on the prior speech data to recognize the second user profile during a subsequent speech interaction with the second user.

3. The computer-implemented method as recited in claim 1, further comprising:

creating a voice recognition score based at least in part on creating the voice attributes;
comparing the voice recognition score to a threshold voice score to determine to provide the second prompt to the second user to obtain the additional speech from the second user for voice training; and
wherein providing the second prompt is based at least in part on the comparing the voice recognition score to the threshold voice score.

4. The computer-implemented method as recited in claim 1, further comprising receiving an expiration associated with the group of privileges for the second user, elapse of the expiration causing the group of privileges to be revoked from the second user profile.

5. The computer-implemented method as recited in claim 1, further comprising at least one of:
revoking a first privilege associated with the group of privileges of the second user profile in response to fourth speech from the first user that includes a first command to revoke the first privilege; or
adding a second privilege to the second user profile in response to the fourth speech from the first user that includes a second command to add the second privilege.

6. The computer-implemented method as recited in claim 1, wherein the voice attributes include at least one of tone, speed, volume, or additional voice attributes.

7. A system comprising:
one or more processors; and
memory storing computer-implemented instructions that, when executed, cause the one or more processors to perform acts to:
receive first audio data representing first speech from a first user associated with a first user profile having an administration privilege;
process content of the first speech to determine at least a second user and a privilege;
provide a prompt including a question that requests the second user to provide speech to be received as training data, and wherein the question is selected from a plurality of predetermined questions used by a voice training algorithm to identify voice attributes associated with the second user;
receive second audio data representing second speech from the second user;
generate the voice training algorithm to identify the voice attributes associated with the second user using the second audio data;
determine, by using the voice training algorithm, second attributes derived from the second speech, the second attributes to enable identification of subsequent speech associated with a second user profile associated with the second user; and
associate the second attributes and the privilege with the second user profile.

8. The system as recited in claim 7, wherein the first speech includes a designation of a group, and wherein the group includes at least the privilege.

9. The system as recited in claim 7, wherein the computer-implemented instructions cause the one or more processors to perform further acts to:
associate the second user profile with prior speech data based at least in part on additional speech provided by the second user; and
create the second attributes based at least in part on the prior speech data to recognize the second user profile during a subsequent speech interaction with the second user.

10. The system as recited in claim 7, wherein the computer-implemented instructions cause the one or more processors to perform further acts to:
create a voice recognition score based at least in part on the second attributes, and
determine to provide a second prompt to the second user to obtain additional speech from the second user for voice training in response to a comparison of the voice recognition score to a threshold voice score.

11. The system as recited in claim 7, wherein the computer-implemented instructions cause the one or more processors to perform further acts to:
receive a condition associated with the privilege for the second user; and
enforce the condition in response to a subsequent voice interaction with the second user.

12. The system as recited in claim 7, wherein the computer-implemented instructions cause the one or more processors to perform further acts to revoke at least one privilege associated with the second user in response to third speech from the first user that includes a command to revoke the at least the one privilege.

13. The system as recited in claim 7, wherein the computer-implemented instructions cause the one or more processors to perform further acts to add at least one privilege to the second user profile in response to third speech from the first user that includes a command to add the at least the one privilege.

14. The system as recited in claim 7, wherein the first speech includes a designation of a first group that includes at least the privilege, the first group being different than a second group of privileges available for granting to the second user profile.

15. The system as recited in claim 7, wherein the computer-implemented instructions cause the one or more processors to perform further acts to connect to a device associated with the second user using a voice over internet protocol, and wherein the receiving the second audio data is received using the voice over internet protocol.

16. The system as recited in claim 7, wherein the computer-implemented instructions cause the one or more processors to perform further acts to:
providing a second prompt including an additional question that requests the second user to provide additional speech to be received as additional training data, wherein the additional question is selected from the plurality of predetermined questions used by the voice training algorithm to refine the voice attributes associated with the second user based at least in part on the second audio data;
receiving third audio data representing third speech from the second user; and
retraining the voice training algorithm to refine the voice attributes associated with the second user using the third audio data.

17. A method comprising:
receiving first audio data representing first speech from a first user;
analyzing first attributes of the first audio data to determine that the first speech is associated with a first user profile having an administration privilege;
determining a second user and a privilege based at least in part on processing of the first speech;

providing a prompt including a question that requests the second user to provide speech to be received as training data, and wherein the question is selected from a plurality of predetermined questions used by a voice training algorithm to identify voice attributes associated with the second user;

receiving second audio data representing second speech from the second user;

generating the voice training algorithm to identify the voice attributes associated with the second user using the second audio data;

determining, by using the voice training algorithm, second attributes derived from the second speech, the second attributes to enable identification of subsequent speech associated with a second user profile associated with the second user; and associating the second attributes and the privilege with the second user profile.

18. The method as recited in claim 17, further comprising:

creating a voice recognition score based at least in part on the second attributes, and comparing the voice recognition score to a threshold voice score to determine whether to provide another prompt to the second user to obtain additional speech from the second user for voice training.

19. The method as recited in claim 17, further comprising at least one of:

revoking a first privilege associated with a group of privileges of the second user profile in response to third speech from the first user that includes a first command to revoke the first privilege; or adding a second privilege to the second user profile in response to third speech from the first user that includes a second command to add the second privilege.

20. The method as recited in claim 17, further comprising:

receiving a condition associated with the privilege for the second user; and enforcing the condition in response to a subsequent voice interaction with the second user.

* * * * *